O. JENSEN.
METHOD OF MANUFACTURING CONCENTRATED NITROUS GASES.
APPLICATION FILED OCT. 6, 1916.
1,291,909.
Patented Jan. 21, 1919.
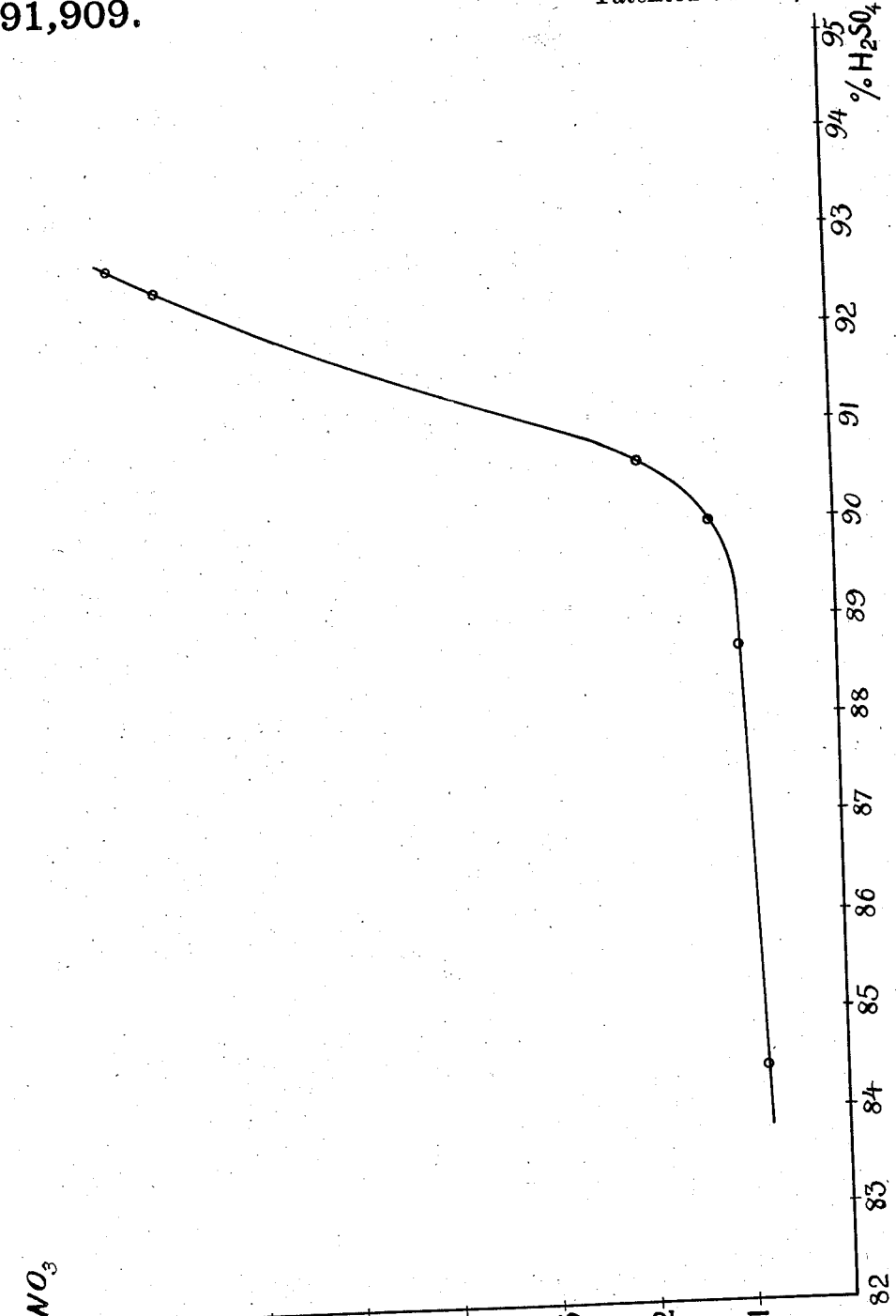

UNITED STATES PATENT OFFICE.

OLAF JENSEN, OF RJUKAN, NORWAY, ASSIGNOR TO NORSK HYDRO-ELEKTRISK KVAELSTOFAKTIESELSKAB, OF CHRISTIANIA, NORWAY.

METHOD OF MANUFACTURING CONCENTRATED NITROUS GASES.

1,291,909.  Specification of Letters Patent.  Patented Jan. 21, 1919.

Application filed October 6, 1916. Serial No. 124,176.

*To all whom it may concern:*

Be it known that I, OLAF JENSEN, a subject of the King of Norway, residing at Rjukan, Norway, have invented certain new and useful Improvements in Methods of Manufacturing Concentrated Nitrous Gases; and I do hereby declare the following to be a full, clear, and exact description of the invention, such as will enable others skilled in the art to which it appertains to make and use the same.

This invention has for its object a method of manufacturing concentrated nitrous gases.

In treating gaseous mixtures of nitrogen and oxygen in electric furnaces the nitrous gases are obtained in a very dilute state, and this circumstance involves several inconveniences in the further utilization of the nitrogen oxids. If the oxids are to be absorbed in water for making nitric acid, only a dilute acid can be obtained, even when extensive absorption apparatus is used, and the manufacture of concentrated nitric acid from the dilute product entails considerable cost. If it is desired to separate out the nitrogen oxids in the liquid state by condensation the dilution tends to make the condensation incomplete and thus involves loss of nitrogen oxids.

Under these circumstances it is of considerable importance to realize a process by which the dilute nitrous gases from the furnace without loss may be converted into concentrated nitrogen oxids.

To this purpose it has already been proposed to make use of alkaline absorbents and to subject the absorption products to decomposing processes by which the nitrogen oxids are expelled.

According to the present invention concentrated nitrogen oxids are obtained by absorbing the dilute nitrous gases in strong sulfuric acid, and subsequently driving out nitrous gases from the nitrosylsulfuric acid by heating.

According to their degree of oxidation nitrogen oxids combine with strong sulfuric acid after the following equations:

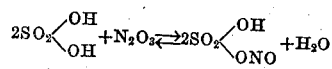

It has already been proposed to use the latter of these reactions for producing nitric acid immediately from dilute nitrous gases. To this purpose the gases must be given opportunity to oxidize as completely as possible to $NO_2, (N_2O_4)$ before they are taken up by the sulfuric acid, a condition which is conveniently realized by subjecting the gases repeatedly to alternating oxidation and absorption.

Contrary to this process the present invention has for its object preferably by means of the reaction $$2SO_2{<}^{OH}_{OH}+N_2O_3 \rightleftarrows 2SO_2{<}^{OH}_{ONO}+H_2O$$

to have the nitrogen oxids combined in the form of nitrosylsulfuric acid. To this purpose nitrous gases of but low degree of oxidation are caused to act on the sulfuric acid. In carrying out this process difficulties are found in effecting the decomposition of the nitrosylsulfuric acid into nitrous oxids and sulfuric acid according to the reaction indicated by the above equation when perused from the right to the left. It is a well known fact, that the nitrosylsulfuric acid is extremely stable, in presence of strong sulfuric acid, so that such mixture may be heated even to the boiling point of the sulfuric acid and some of the latter be distilled, without any considerable decomposition of the nitrosylsulfuric acid. Even by supplying air during the heating operation only very small quantities of nitrogen oxids are driven out. It is true that the decomposition of the nitrosylsulfuric acid into $N_2O_3$ and sulfuric acid is easily effected by heating after adding water, or by supplying a sufficient quantity of steam. This method is not workable for economical reasons, as the sulfuric acid is diluted and then requires concentration before it can be reused for absorption of nitrous gases.

By numerous experiments, I have now ascertained that mixtures of nitrosylsulfuric acid and sulfuric acid such as are formed by absorbing nitrous gases in strong sulfuric acid may be almost completely freed from nitrogen oxids simply by heating and without the addition of water or denitrating substances, provided that the sulfuric acid used for the absorption does not exceed 90–91 per cent. strength.

Further it is a condition for the denitration that the heating be combined with a dephlegmation of the escaping vapors. The nitrous vitriol is then conveniently supplied at the top of the dephlegmation apparatus and flows downward into the heating vessel.

If sulfuric acid of higher percentage than above stated is used for absorption, the nitrous vitriol obtained shows, even when dephlegmation devices are used, approximately the behavior above mentioned of mixtures of nitrosylsulfuric acid and sulfuric acid. The higher the concentration of the sulfuric acid is, the greater the quantity of nitrogen oxids retained in the acid after heating. According to my experiments the limit of 90% for the concentration of the sulfuric acid, where an almost complete denitration takes place is very keenly marked. This fact is pregnantly illustrated by the accompanying diagram, in which the abscissas represent the strengths of sulfuric acid used for absorption and the ordinates give the quantities of nitrogen retained (here expressed as per cent. $HNO_3$). The curve has a marked bend at the concentration of about 90 per cent.

The quantities of nitrogen registered in the diagram are to be considered as comparative values, obtained in denitrating different absorption liquors under like conditions. The solubility of nitrosylsulfuric acid in sulfuric acid rises with the concentrations of the latter. In sulfuric acid of 83 per cent. the solubility is only $\frac{2}{3}$ of that in acid of 91 per cent. In carrying out the method practically it will therefore be most convenient to use an acid strength of about 90%, which allows both an effective absorption and a complete denitration. It is, however, understood that small variations in the concentration of the sulfuric acid used do not interfere with the practicability of the method. In view of the efficiency of absorption it is not possible to go far below the said concentration.

The advantages of the present method are obvious. The dilute nitrous oxids in the furnace gases are obtained as concentrated $N_2O_3$ without dilution of the sulfuric acid so that the latter may immediately be reused for absorption. When the concentrated gases from the denitrating apparatus are absorbed in water under supply of a sufficient quantity of air, nitric acid of 67% is readily obtained. Or the said nitrous gases may be used for the production of liquid $N_2O_4$. The method offers further advantages when the nitrogen combustion is carried out with air rich in oxygen, in which case a closed system of gas circulation is used. According to the present method, the gases are then removed from the system in the state of $N_2O_3$ while in the usual manner of working with absorption in water, nitrogen and oxygen are consumed in the proportion $2N:5O$. As in this case a continuous supply of relatively pure oxygen is required, this saving of oxygen represents an important advantage in the economy of the process. The further treatment of $N_2O_3$ for nitric acid may, as already mentioned, be effected by means of air.

I claim—

1. In the method of manufacturing concentrated nitrous gases and products to be obtained therefrom, the step which comprises absorbing dilute nitrous gases in sulfuric acid of sufficient concentration to decompose resulting nitrosylsulfuric acid by heating under dephlegmation action without the use of denitrating substances.

2. Method of manufacturing concentrated nitrous gases and products to be obtained therefrom, comprising the steps of absorbing dilute nitrous gases in sulfuric acid of about 90% strength and heating the liquor thereby obtained with the aid of a dephlegmator without use of denitrating substances.

3. Method of manufacturing concentrated nitrous gases and products to be obtained therefrom, comprising the steps of absorbing dilute nitrous gases in sulfuric acid of strength sufficient to liberate substantially all of the absorbed nitrous gases by heat without the presence of denitrating substances, heating the liquor thereby obtained with the aid of a dephlegmator without use of denitrating substances, and re-using the denitrated sulfuric acid without further treatment for absorption of dilute nitrous gases.

In testimony that I claim the foregoing as my invention I have signed my name in presence of two subscribing witnesses.

OLAF JENSEN.

Witnesses:
  C. Fabricius Hansen,
  Karl L. Lee.